United States Patent [19]

Cooper et al.

[11] 4,154,903

[45] May 15, 1979

[54] ELECTROCHEMICAL CELL WITH CALCIUM ANODE

[75] Inventors: John F. Cooper, Castro Valley; Pamela K. Hosmer; Benjamin E. Kelly, both of Tracy, all of Calif.

[73] Assignee: The United States of America as represented by the United States Department of Energy, Washington, D.C.

[21] Appl. No.: 906,817

[22] Filed: May 17, 1978

[51] Int. Cl.² .............................................. H01M 8/08
[52] U.S. Cl. ...................................... 429/27; 429/46; 429/199
[58] Field of Search ................... 429/27, 46, 199, 218, 429/206

[56] References Cited

PUBLICATIONS

A. Charkey et al., "Metal-Air Systems, 2. Metal-Air Battery Systems", Proc. 20th Annual Power Sources Conf., Red Bank, New Jersey, 1966.

*Primary Examiner*—Anthony Skapars
*Attorney, Agent, or Firm*—Roger S. Gaither; Irene S. Croft; William S. Bernheim

[57] ABSTRACT

An electrochemical cell comprising a calcium anode and a suitable cathode in an alkaline electrolyte consisting essentially of an aqueous solution of an hydroxide and a chloride. Specifically disclosed is a mechanically rechargeable calcium/air fuel cell with an aqueous NaOH/NaCl electrolyte.

6 Claims, 4 Drawing Figures

ELECTROCHEMICAL CELL WITH CALCIUM ANODE

BACKGROUND OF THE INVENTION

The invention described herein was made at Lawrence Livermore Laboratory under United States Department of Energy Contract No. W-7405-ENG-48 with the University of California.

This invention relates to an electrochemical cell, particularly an electrochemical cell comprising a calcium anode and a suitable cathode in an aqueous electrolyte.

Metal/air systems can be considered as special types of fuel cells consisting of an active metal as fuel on the anode side and a gas electrode operating on atmospheric oxygen as the cathode. A metal/air fuel cell is extremely attractive as a power source for a vehicle for a number of reasons. Mechanical rechargeability allows rapid and convenient extension of vehicle range. The power delivered by the cell is independent of the total stock of fuel; consequently, performance does not depend on the depth of discharge of the system. The quantity of fuel initially stocked may be matched to the intended range, being limited only by the considerations of gross vehicle weight. The operator has confident knowledge of the "state of charge" and range of the vehicle, being able to directly measure the total weight, volume, etc., of unused fuel on board at any given time. The weakest parts of the system may be removed and replaced periodically, without loss of the entire power source. All of these advantages are well-known features of the gasoline automobile which has set a perhaps irrevocable standard of performance for private transportation.

A large variety of systems has been investigated, the most developed system being the zinc/air system operating in alkaline solution. Calcium is theoretically superior to zinc as regards both voltage and energy density, but the corrosion problem with calcium has limited it to use with nonaqueous electrolytes. However, the air cathode requires an aqueous medium for oxygen reduction. In order to circumvent the corrosion problem, it has been proposed to use a partially aqueous electrolyte consisting of two parts methanol and one part water. This system is described in A. Charkey and G. A. Dalin, "METAL-AIR SYSTEMS 2. Metal-Air Battery Systems", *PROC. 20TH ANNUAL POWER SOURCES CONFERENCE,* Red Bank, New Jersey, 1966. However, this cell has a relatively low total energy efficiency, in addition to the disadvantage of using a relatively expensive electrolyte material (methanol).

Additional advantages of calcium as an electrochemical fuel stem from its extreme abundance in concentrated minerals and from the existence of a large market for lime which would obviate the economic necessity for recycling fuel cell reaction products.

A calcium anode may also be used in a calcium/water cell, using a water cathode in which water is reduced at an inert cathode. Calcium/water cells have potential use in energy standby power systems or marine applications.

SUMMARY OF THE INVENTION

It has now been found that, in an electrochemical cell using a calcium anode in an aqueous alkaline electrolyte, the addition of chloride ion to the electrolyte produces a stable active electrode state. Briefly, then, the present invention provides an electrochemical cell comprising a calcium anode, a cathode, and an electrolyte consisting essentially of an aqueous solution of an hydroxide and an amount of a chloride sufficient to promote a stable active state. At extreme $OH^-/CL^-$ ratios, rapid passivation or uncontrolled corrosion occurs, but intermediate mixtures of $OH^-$ and $Cl^-$ provide a stable active state with coulombic efficiencies which may approach 100%.

In a particular embodiment of the invention, an inert electrode to reduce atmospheric oxygen is used as the cathode to provide a calcium/air fuel cell. In another embodiment of the invention, water is reduced at an inert cathode to provide a calcium/water cell.

It is, therefore, an object of this invention to provide an electrochemical cell using a calcium electrode.

A particular object of this invention is to provide an electrochemical cell using a calcium anode in an aqueous electrolyte, specifically, an aqueous alkaline electrolyte.

A specific object of this invention is to provide a calcium/air ($O_2$) fuel cell.

Another specific object of this invention is to provide a calcium/water cell.

Other objects of the invention will become apparent from the following detailed description made with reference to the following drawings.

DETAILED DESCRIPTION OF THE INVENTION

Broadly, the present invention is an electrochemical cell comprising a calcium anode, a cathode, and an electrolyte consisting essentially of an aqueous solution of a metal hydroxide and sufficient metal chloride to promote a stable active electrode state. The most suitable electrolyte materials are the alkali metal hydroxides and alkali metal chlorides, preferably of the same alkali metal. A minor amount of a corrosion inhibitor, such as sodium stannate, may be added to the electrolyte to allow improvement of coulombic efficiency at highly reducing potentials.

The present invention is particularly suitable for use with an atmospheric oxygen cathode or a water cathode, but is not limited thereto. Any cathode which is compatible with an alkaline electrolyte and with the calcium reaction products may be used.

Figure 1:
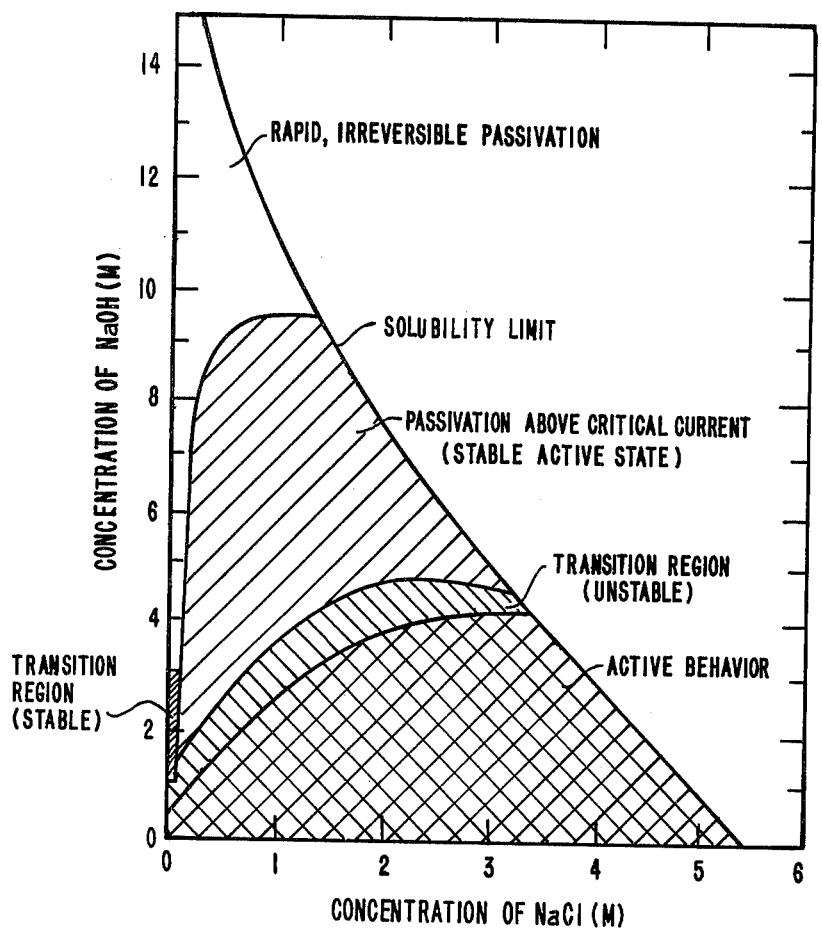
FIG. 1 is a graph showing effects of electrolyte composition on anode behavior.

The invention will be described in detail with respect to the NaOH/NaCl electrolyte system. Anodic dissolution of calcium in pure sodium hydroxide solutions shows rapid irreversible passivation above 4 M and rapid corrosion accompanied by vigorous hydrogen evolution below about 3 M. In accordance with the present invention, it was found that the addition of chloride ion to 3-10 M sodium hydroxide solutions promotes an active electrode state, where the voltage obeys a linear polarization law with an electrical resistivity of 30-300 ohm-mm². The results obtained by experimental investigation at ambient temperatures of the effect of electrolyte composition on anode behavior are shown graphically in FIG. 1. It is evident from the graph that at high ratios of NaOH to NaCl rapid passivation occurs, while low ratios of NaOH/NaCl yield uncontrollable hydrogen evolution and rapid calcium dissolution. However, at intermediate ratios a stable active state is promoted. Similar mappings describe other water-based metal hydroxide-chloride solutions since the anode behavior is independent of the cation associated with the $OH^-$ and the $cl^-$ ions.

Figure 2:
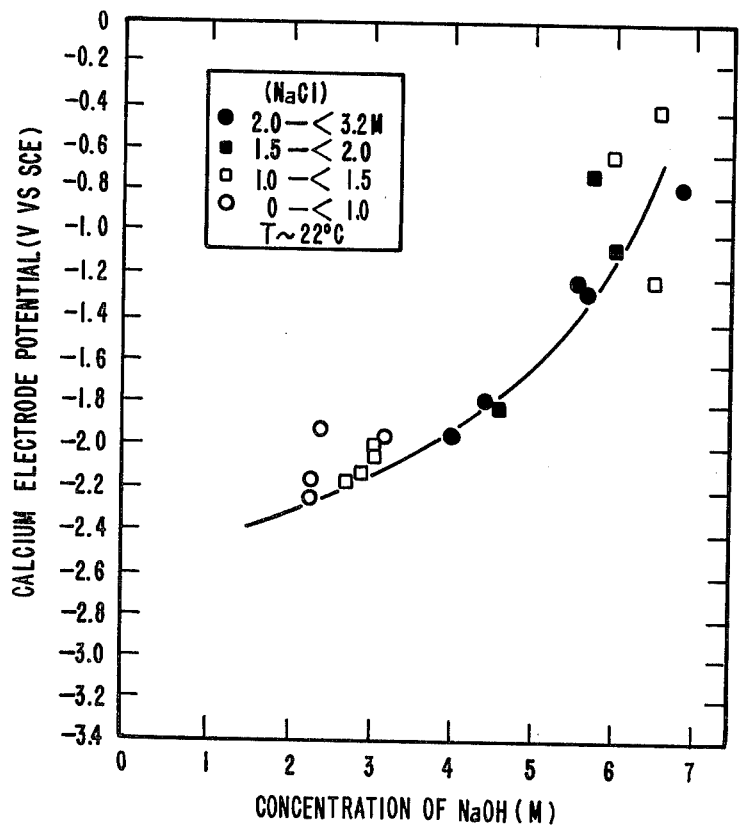
FIG. 2 is a graph showing steady state electrode potential at a current density of 1 $kA/m^2$ as a function of sodium hydroxide concentration at varying concentrations of sodium chloride.
Figure 3:
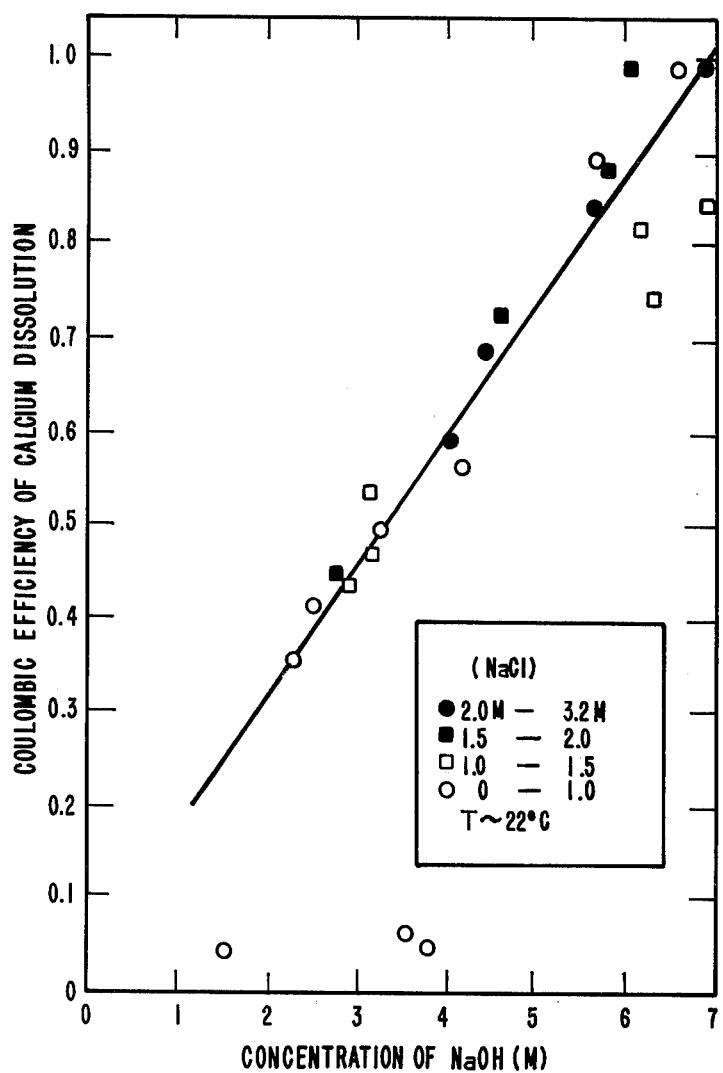
FIG. 3 is a graph showing the coulombic efficiency (steady state values) of calcium dissolution as a function of sodium hydroxide concentration at varying concentrations of sodium chloride, and for a range of current densities on the order of 0.5-5 $kA/m^2$.

Polarization curves and coulombic efficiency data for calcium dissolution were also obtained for mixed sodium hydroxide, sodium chloride electrolytes under conditions of forced electrolyte convection and are shown graphically in FIG. 2 and FIG. 3, respectively. As shown in FIG. 2, the polarization of the calcium anode increases with increasing hydroxide concentration, and changes in chloride concentration were found to have little effect on the electrode potential of fully activated anodes. FIG. 3 shows that coulombic efficiency increases with hydroxide concentration, approaching 100% near the solubility limit of the mixed hydroxide-chloride solutions. Coulombic efficiency shows no marked dependence on chloride concentration for activated anodes. Consideration of the data shown in FIGS. 2 and 3 provides the NaOH/NaCl composition which produces the most favorable combination of low electrode polarization and high coulombic efficiency; the most favorable combination was obtained with compositions promoting passivity above a critical current, that is, the active stable state region shown in FIG. 1. In general, optimum performance, with respect to the NaOH/NaCl system, is obtainable with a mixture of 5-7 M NaOH and 1-3 M NaCl.

Figure 4:
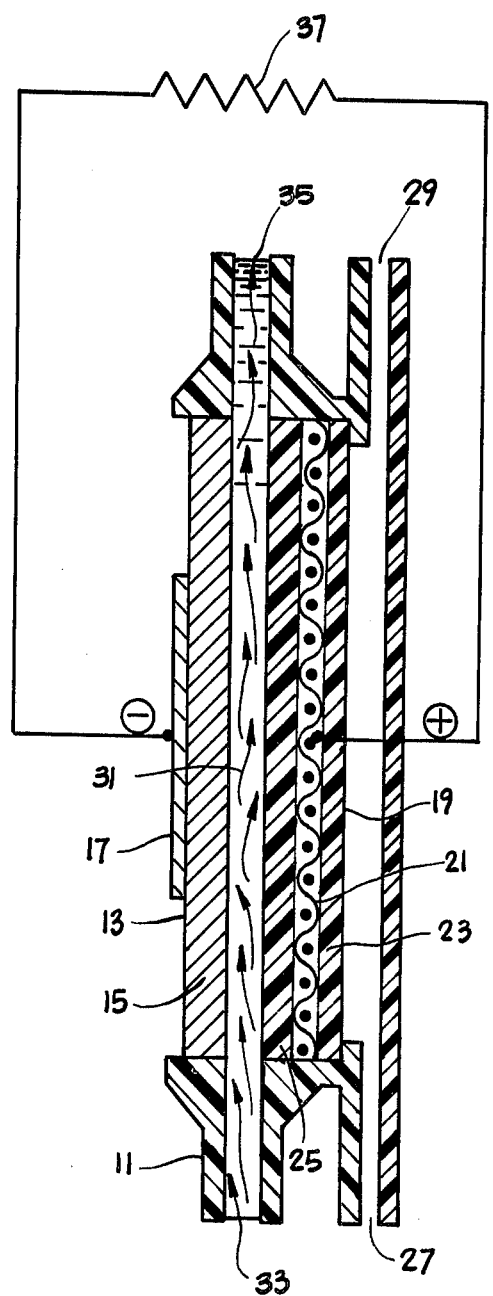
FIG. 4 is a schematic representation of an electrochemical cell in accordance with a particular embodiment of the invention.

A particular embodiment of the present invention, a calcium/air fuel cell operating on atmospheric oxygen as the cathode, is shown schematically in FIG. 4. Referring to FIG. 4, numeral 11 refers to the cell case which is fabricated of any suitable material such as polypropylene. The anode 13 consists of a calcium anode 15 backed by suitable current collector means 17, e.g., copper. The air-cathode 19 is a conventional structure consisting of a suitable current collector 21, a hydrophobic layer 23, and a hydrophilic layer 25 so that oxygen may reach electrolyte wetted surfaces, but the electrolyte will not pass completely through the air-cathode structure. The current collector, which is referred to in the art as an "inert cathode", provides a catalytic surface at which the cathodic reactant is reduced. A porous structure is generally used, e.g., a metal grid, expanded metal or screen, porous graphite catalyzed with platinum black, or the like. Materials useful for the hydrophobic and the hydrophilic layers are well known in the art and readily available. Air enters the cathode compartment via air intake means 27 and exits the compartment via air exhaust means 29. A flowing electrolyte 31 is used which allows the maintenance of a constant composition electrolyte. The electrolyte, which consists of a mixture of a hydroxide and a chloride as hereinbefore described, enters the electrolyte compartment via electrolyte intake means 33 and leaves by means of electrolyte exhaust means 35. The load on the cell is represented by numeral 37.

The reactions which take place in the cell may be represented by the following equations:

$$Ca \rightarrow CA^{++} + 2e^- \quad \text{(Anode)}$$

$$H_2O + \tfrac{1}{2}O_2 + 2e^- \rightarrow 2OH^- \quad \text{(Cathode)}$$

$$Ca + H_2 + \tfrac{1}{2}O_2 \rightarrow CA(OH)_{0+} \quad \text{(Net reaction)}$$

As a specific example illustrative of the present invention, consider a calcium/air fuel cell operating on atmospheric oxygen as the cathode and using porous graphite catalyzed with platinum as the inert cathode. An electrolyte consisting of a solution of 6 M NaOH and 1.5 M NaCl is flowed through the cell. The coulombic efficiency of the cell, operating at room temperature ($\sim 25^\circ$ C.) is 100%, with an anode voltage of $-1.0$ volt, as measured against a saturated calomel electrode at an anode current density of 0.1 A/cm².

In another embodiment of the invention, a water cathode is used to provide a calcium/water cell. The cell configuration is similar to that shown in FIG. 4, but in the place of the air cathode a water cathode is used. A water cathode consists of a current collector or inert cathode, such as a metal screen, in contact with the aqueous electrolyte. The reactions which take place in the calcium/water cell may be represented by the following equations:

$$Ca \rightarrow Ca^{++} + 2e^- \quad \text{(Anode)}$$

$$2H_2O + 2e^- \rightarrow H_2 + 2OH^- \quad \text{(Cathode)}$$

$$Ca + 2H_2O \rightarrow Ca(OH)_2 + H_2 \quad \text{(Net reaction)}$$

Both the calcium/air cell and the calcium/water cell are readily rechargeable mechanically.

Thus, it has been shown that the present invention provides a stable electrochemical cell using a calcium anode and an aqueous electrolyte which may be used as a fuel cell or any emergency power source.

Although the invention has been hereinbefore described with reference to specific embodiments and a specific example, it is to be understood that various changes and modifications will be obvious to those skilled in the art without departing from the true spirit of the invention. In particular, it is to be understood that any cathode may be used, provided it is compatible with an alkaline electrolyte and with the cell discharge products.

What we claim is:

1. An electrochemical cell comprising a calcium anode, a cathode, and an electrolyte consisting essentially of an aqueous solution of a metal hydroxide and a sufficient amount of a metal chloride to promote a stable active electrode state.

2. An electrochemical cell as in claim 1 wherein the metal hydroxide is an alkali metal hydroxide and the metal chloride is an alkali metal chloride.

3. An electrochemical cell as in claim 2 wherein the alkali metal hydroxide is sodium hydroxide and the alkali metal chloride is sodium chloride.

4. An electrochemical cell as in claim 3 wherein the electrolyte consists essentially of an aqueous solution about 5-7 M NaOH and about 1-3 M NaCl.

5. An electrochemical cell as in claim 1 wherein the cathode is an oxygen cathode.

6. An electrochemical cell as in claim 1 wherein the cathode is a water cathode.

* * * * *